Oct. 19, 1937.    G. L. DIMMICK    2,096,576
PUSH-PULL SOUND RECORDER
Filed July 23, 1935
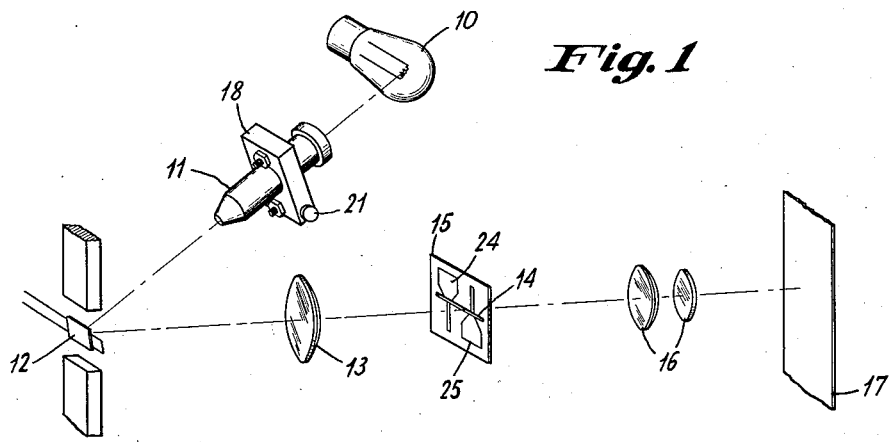
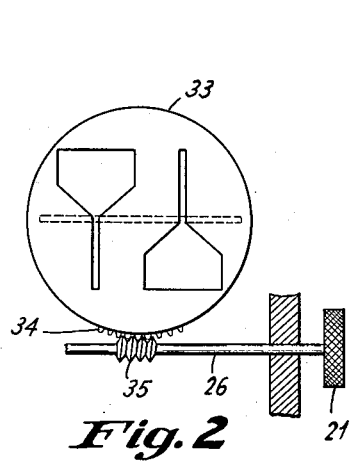
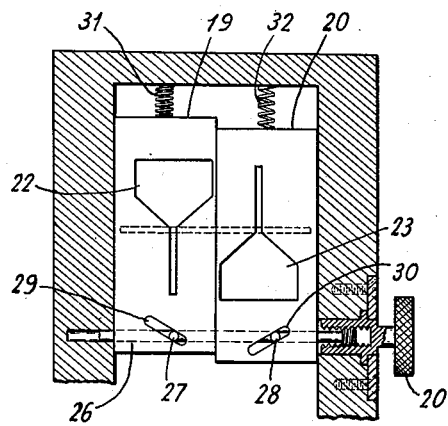
INVENTOR
GLENN L. DIMMICK
BY  H. S. Grover
ATTORNEY Patented Oct. 19, 1937

2,096,576

UNITED STATES PATENT OFFICE 2,096,576

PUSH-PULL SOUND RECORDER

Glenn L. Dimmick, Audubon, N. J., assignor to Radio Corporation of America, a corporation of Delaware Application July 23, 1935, Serial No. 32,732

4 Claims. (Cl. 179—100.3)

This invention relates to the production of sound records having the positive and negative half cycles recorded on tracks spaced from one another, and has for its principal object the provision of an improved apparatus and method of operation for minimizing the distortion likely to occur at low amplitude of the recorded sound.

In a copending application Serial No. 610,302, filed Aug. 9, 1932 and assigned to the same assignee as the present application is disclosed a push-pull sound recorder which involves the use of a pair of triangularly-shaped light beams arranged to be vibrated transversely of a light slit in accordance with the sound or audio current to be recorded. The apices of these triangularly-shaped light beams are pointed in opposite directions and must be carefully adjusted with respect to the center of the light slit if distortion at low amplitude of the recorded sound is to be avoided.

In accordance with the present invention the relation between the triangularly-shaped light beams' apices and the light slit is controlled by either large moving light defining masks relatively to one another or by moving a single mask relatively to the other parts of the optical system in which it is interposed.

The invention will be better understood from the following description when considered in connection with the accompanying drawing and its scope will be pointed out in the appended claims.

Referring to the drawing,

Fig. 1 illustrates a sound recorder in which the invention has been embodied, and Figs. 2 and 3 illustrate certain details of such a recorder.

The recorder of Fig. 1 includes a lamp 10 from which light passes through an optical unit 11 to the vibratable mirror 12 to a recording galvanometer. Light reflected from the mirror passes through the lens 13 and the light slit 14 of a screen 15 and lenses 16 to the surface of a record 17.

The optical unit 11 differs from those previously known in that it includes a casing 18 within which are mounted aperture masks 19 and 20 (see Fig. 3) which may be adjusted with respect to one another by means of a thumb screw 21. The masks 19 and 21 are provided with triangularly-shaped apertures 22 and 23, the images of which appear on the screen 15 at 24 and 25.

As previously indicated, distortion is likely to be produced at low amplitude of the recorded sound, if the vertices of the images 24 and 25 are not accurately adjusted with respect to the center of the slit 14. This adjustment is realized by means of the mechanism of Fig. 3 wherein rotation of the control knob 21 produces transverse movement of a rod 26 which is provided with pins 27 and 28 arranged to cooperate with slots 29 and 30 of the masks 19 and 20. Thus, when the knob 21 is rotated in a manner to move the rod 26 to the left the mask 20 is raised and the mask 19 is lowered and vice versa. In order to ensure accurate movement of the masks springs 31 and 32 are interposed between the casing and the upper ends of the masks.

Instead of the arrangement of Fig. 3, the circular multi-apertured mask 33 of Fig. 2 may be used. This mask is provided at its edge with a gear 34 arranged to cooperate with a worm 35 mounted on the rod 26. With this arrangement the vertices of the images 24 and 25 may obviously be moved into the same relation with respect to the center of the slit 14 which is indicated in dotted lines on Figs. 2 and 3.

I claim:

1. A sound recorder including means forming a light slit, means for producing at said slit a plurality of opposed light images, means operable to adjust said images oppositely with respect to said slit, and means for vibrating said images transversely of said slit in accordance with the sound to be recorded.

2. A sound recorder including a member provided with a light slit, means for producing on said member a plurality of triangularly-shaped light images having their vertices opposed to one another, means operable to adjust said vertices oppositely with respect to said slit, and means for moving said images transversely of said slit in accordance with the sound to be recorded.

3. A sound recorder including a member provided with a light slit, means including a plurality of apertured masks for producing a plurality of light images on said member, means associated with said masks for simultaneously adjusting said images oppositely with respect to said slit, and means for vibrating said images transversely of said slit in accordance with the sound to be recorded.

4. A sound recorder including a member provided with a light slit, means including a rotatable apertured mask for producing a plurality of oppositely-directed triangular light images at said member, means associated with said mask for adjusting said images with respect to said slit, and means for vibrating said images transversely of said slit in accordance with the sound to be recorded.

GLENN L. DIMMICK.